United States Patent
LeMasters et al.

(10) Patent No.: US 11,966,504 B2
(45) Date of Patent: Apr. 23, 2024

(54) SECURITY COMPONENT FOR DEVICES ON AN ENUMERATED BUS

(71) Applicant: CrowdStrike, Inc., Sunnyvale, CA (US)

(72) Inventors: Aaron LeMasters, New York, NY (US); Ion-Alexandru Ionescu, Seattle, WA (US)

(73) Assignee: CROWDSTRIKE, INC., Sunnyvale, CA (US)

( * ) Notice: Subject to any disclaimer, the term of this patent is extended or adjusted under 35 U.S.C. 154(b) by 152 days.

(21) Appl. No.: 17/466,861

(22) Filed: Sep. 3, 2021

(65) Prior Publication Data

US 2021/0397750 A1  Dec. 23, 2021

Related U.S. Application Data

(63) Continuation of application No. 15/873,670, filed on Jan. 17, 2018, now Pat. No. 11,113,425.

(51) Int. Cl.
*G06F 21/82* (2013.01)
*G06F 9/4401* (2018.01)
(Continued)

(52) U.S. Cl.
CPC ............ *G06F 21/82* (2013.01); *G06F 9/4415* (2013.01); *G06F 13/385* (2013.01);
(Continued)

(58) Field of Classification Search
CPC ........ G06F 21/82; G06F 21/554; G06F 21/56; G06F 21/572; G06F 21/71; G06F 21/85;
(Continued)

(56) References Cited

U.S. PATENT DOCUMENTS 5,807,175 A  9/1998  Davis et al.
7,082,598 B1  7/2006  Le et al.
(Continued)

FOREIGN PATENT DOCUMENTS

EP        3514717 A1 *  7/2019  .......... G06F 11/1433
WO   WO-2007034157 A1 *  3/2007  ............ G06F 21/10
(Continued)

OTHER PUBLICATIONS

Partial European Search Report dated Apr. 1, 2019 for European Patent Application No. 19151384.5, 14 pages.
(Continued)

*Primary Examiner* — Sarah Su
(74) *Attorney, Agent, or Firm* — Lee & Hayes P.C.

(57) ABSTRACT

A plug-and-play (PnP) driver associated with a security agent is described herein. The PnP driver attaches to device stacks of enumerated bus devices of a computing device as upper-device or lower-device filters based on the device classes of the enumerated bus devices. For example, the PnP driver may attach to the device stack of a hub or controller device as an upper-device filter and to device stacks of other devices as lower-device filters. Either while attaching or after attachment, the PnP driver may take action to alter, limit, or otherwise block functionality of an enumerated bus device. The PnP driver may also perform a system inventory of enumerated bus devices connected to the computing device and create fingerprints for one or more of the computing devices. Additionally, the PnP driver may create and remove control device objects (CDOs) to enable communication with user-mode processes or threads.

23 Claims, 5 Drawing Sheets

(51) Int. Cl.
  *G06F 13/38* (2006.01)
  *G06F 13/40* (2006.01)
  *G06F 21/55* (2013.01)
  *G06F 21/56* (2013.01)
  *G06F 21/57* (2013.01)
  *G06F 21/71* (2013.01)
  *G06F 21/85* (2013.01)
  *G06F 13/20* (2006.01)

(52) U.S. Cl.
  CPC ........ *G06F 13/387* (2013.01); *G06F 13/4063* (2013.01); *G06F 21/554* (2013.01); *G06F 21/56* (2013.01); *G06F 21/572* (2013.01); *G06F 21/71* (2013.01); *G06F 21/85* (2013.01); *G06F 13/20* (2013.01); *G06F 2221/2141* (2013.01)

(58) Field of Classification Search
  CPC .... G06F 9/4415; G06F 13/385; G06F 13/387; G06F 13/4063; G06F 13/20; G06F 2221/2141
  See application file for complete search history.

(56) References Cited

U.S. PATENT DOCUMENTS

| | | | | |
|---|---|---|---|---|
| 8,554,957 | B1* | 10/2013 | Wieland | G06F 13/36 719/321 |
| 8,667,590 | B1* | 3/2014 | Lee | G06F 21/564 726/13 |
| 9,182,996 | B2* | 11/2015 | Kempka | G06F 9/4413 |
| 9,830,099 | B1 | 11/2017 | Johansson et al. | |
| 10,078,609 | B1* | 9/2018 | Raju | G06F 13/385 |
| 10,534,351 | B1* | 1/2020 | Martell | G05B 19/41845 |
| 10,990,371 | B2 | 4/2021 | Gutman et al. | |
| 11,113,425 | B2* | 9/2021 | LeMasters | G06F 21/82 |
| 11,599,641 | B2* | 3/2023 | Kreuzer | G06F 21/575 |
| 2001/0021956 | A1* | 9/2001 | Okamoto | G06F 13/42 710/301 |
| 2004/0064604 | A1 | 4/2004 | Cox | |
| 2008/0211670 | A1* | 9/2008 | Gordon | H04L 63/1408 340/572.1 |
| 2009/0328075 | A1* | 12/2009 | Herskedal | G06F 13/387 719/321 |
| 2010/0257284 | A1* | 10/2010 | Kim | G06F 21/83 710/9 |
| 2013/0152201 | A1 | 6/2013 | Gullotto et al. | |
| 2013/0298192 | A1 | 11/2013 | Kumar et al. | |
| 2014/0033234 | A1* | 1/2014 | Wang | G06F 9/4413 719/327 |
| 2014/0268229 | A1 | 9/2014 | Kempka | |
| 2014/0366131 | A1 | 12/2014 | Lai | |
| 2016/0006753 | A1 | 1/2016 | McDaid et al. | |
| 2016/0344754 | A1 | 11/2016 | Rayapeta et al. | |
| 2018/0020017 | A1 | 1/2018 | Subramanya et al. | |
| 2018/0060591 | A1 | 3/2018 | Dobrila et al. | |
| 2018/0077195 | A1 | 3/2018 | Gathala et al. | |
| 2018/0191521 | A1 | 7/2018 | Ahmed et al. | |
| 2018/0210770 | A1* | 7/2018 | Vajravel | G06F 9/545 |
| 2018/0268126 | A1 | 9/2018 | Kaushik et al. | |
| 2019/0081949 | A1 | 3/2019 | Wu et al. | |
| 2019/0180056 | A1 | 6/2019 | Almeida | |
| 2019/0220260 | A1* | 7/2019 | Gutman | G06F 11/1433 |
| 2019/0220626 | A1 | 7/2019 | LeMasters et al. | |
| 2019/0220627 | A1* | 7/2019 | LeMasters | G06F 21/54 |
| 2020/0226298 | A1 | 7/2020 | Appleboum et al. | |

FOREIGN PATENT DOCUMENTS

| | | | | |
|---|---|---|---|---|
| WO | WO2012106049 | A1 | 8/2012 | |
| WO | WO-2012135192 | A2* | 10/2012 | ............ G06F 11/00 |

OTHER PUBLICATIONS

Extended European Search Report dated Jul. 3, 2019 for European Patent Application No. 19151384.5, 12 pages.
Office Action for U.S. Appl. No. 15/873,670, dated Jan. 6, 2021, Lemasters, "Security Component for Devices on an Enumerated Bus", 14 Pages.
Final Office Action dated Sep. 9, 2020 for U.S. Appl. No. 15/873,670, "Security Component for Devices on an Enumerated Bus", LeMasters, 13 pages.
Non Final Office Action dated Mar. 30, 2020 for U.S. Appl. No. 15/873,670 "Security Component for Devices on an Enumerated Bus" LeMasters, 10 pages.

* cited by examiner

SECURITY COMPONENT FOR DEVICES ON AN ENUMERATED BUS

RELATED APPLICATIONS

This application is a continuation of and claims priority to U.S. patent application Ser. No. 15/873,670, filed Jan. 17, 2018, titled "SECURITY COMPONENT FOR DEVICES ON AN ENUMERATED BUS," the entirety of which is incorporated herein by reference.

BACKGROUND

With Internet use forming an ever greater part of day to day life, security exploits that steal or destroy system resources, data, and private information are an increasing problem. Governments and businesses devote significant resources to preventing intrusions and thefts related to these security exploits. Security exploits come in many forms, such as computer viruses, worms, trojan horses, spyware, keystroke loggers, adware, and rootkits. These exploits are delivered in or through a number of mechanisms, such as spearfish emails, clickable links, documents, executables, or archives. Some of the threats posed by security exploits are of such significance that they are described as cyber terrorism or industrial espionage.

Many security exploits are delivered through devices on an enumerated bus, such as universal serial bus (USB) devices, or through devices, processes, or threads posing as such devices on an enumerated bus. Other threats tied to devices on an enumerated bus include insider threats (e.g., stealing proprietary information) and insertion of a base device (e.g., on a laptop, by mistake or directly, by a malicious person). Current techniques for detecting these security exploits and threats are limited. For example, if serial numbers of malicious USB devices are known, such devices may be detected and blocked. Device serial numbers are not always known or available, however.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
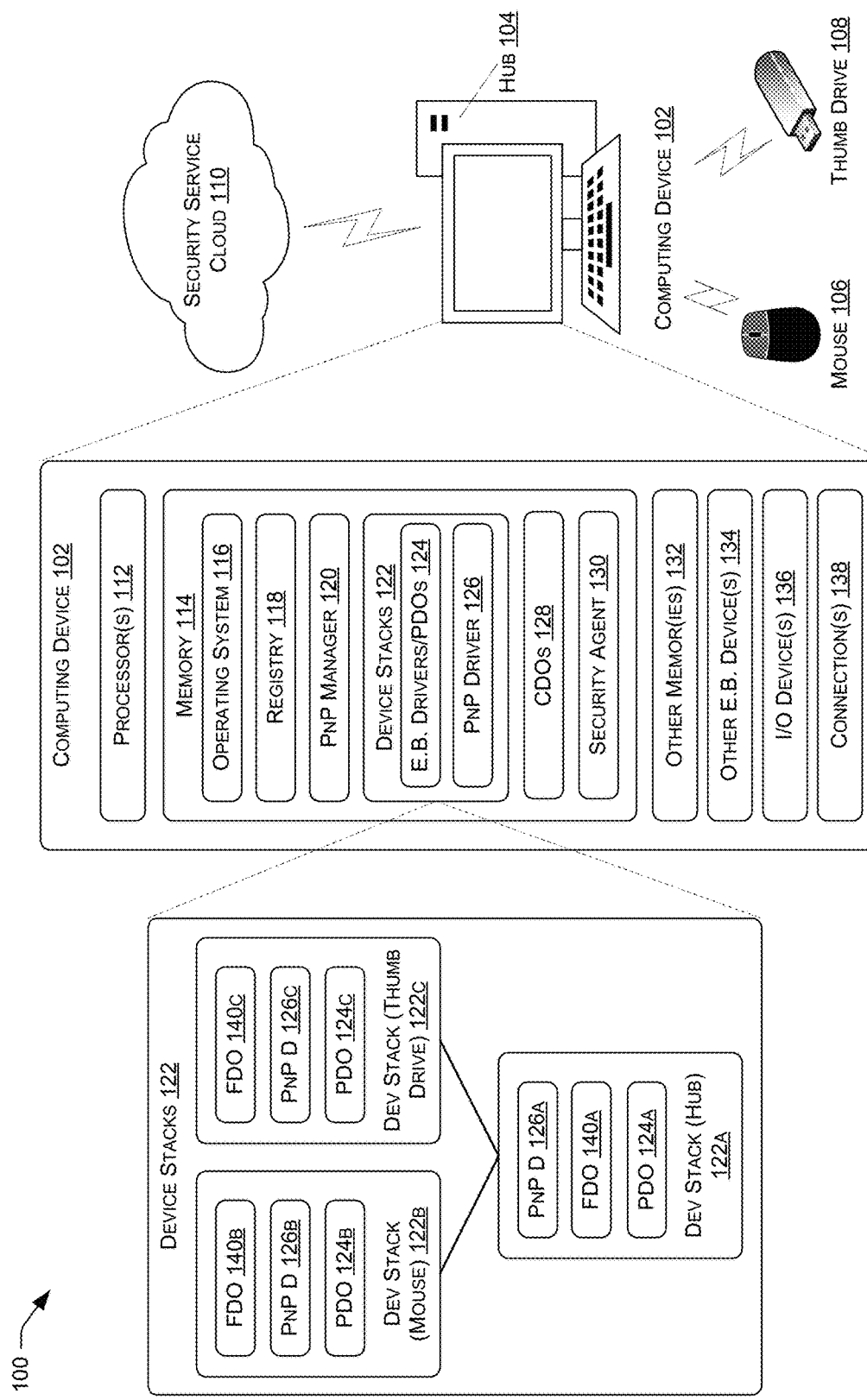
FIG. 1 illustrates an example computing environment including a computing device, enumerated bus devices connected to that computing device, and software components for managing and securing the computing device and enumerated bus devices.

This disclosure describes, in part, a PnP driver associated with a security agent. The PnP driver attaches to device stacks of devices of an enumerated bus (also referred to herein as "enumerated bus devices") of a computing device as upper-device or lower-device filters based on the device classes of the enumerated bus devices. For example, the PnP driver may attach to the device stack of a hub or controller device as an upper-device filter and to device stacks of other devices as lower-device filters. Either while attaching or after attachment, the PnP driver may take action to alter, limit, or otherwise block functionality of an enumerated bus device, such as a USB device. The PnP driver may also perform a system inventory of enumerated bus devices connected to the computing device and create fingerprints for one or more of the computing devices. Additionally, the PnP driver may create and remove CDOs to enable communication with user-mode processes or threads.

As used herein, "enumerated bus devices" include a broad range of device types, such as USB devices defined by the USB specification regardless of whether or not those device types are specifically classified as USB devices by the operating system of the computing device. Enumerated bus devices may include, for instance, any internal or external devices on an enumerated bus.

In various implementations, when loaded, the PnP driver receives a message, such as an enumeration of enumerated bus devices attached to a hub device or controller, from a driver of that hub device or controller. The PnP driver may be attached as an upper-device filter in the device stack of such a hub device or controller. Upon receiving the message, the PnP driver iterates through the enumerated bus devices and determines, for each enumerated bus device, whether the enumerated bus device is a hub or controller. The PnP driver then attaches as an upper-device filter or lower-device filter in the device stack of each of the enumerated bus devices based at least in part on the device class of that enumerated bus device (e.g., whether the enumerated bus device is a hub/controller or is another sort of device).

In some implementations, in a decision phase prior to attachment to an enumerated bus device, the PnP driver may compare indicative features of that enumerated bus device to configuration policies of the PnP driver and may decide to alter, limit, or otherwise block functionality of the enumerated bus device. Such configuration policies may include combinations of indicative features that form indicators of attack (IoA) associated with known security exploits or devices that contain known malicious firmware or firmware that is determined to be malicious based on static properties extracted from indicative features and/or behavioral properties extracted from inspection of data sent to/from the device. Upon determining that functionality of an enumerated bus device should be altered, limited, or otherwise blocked, the PnP driver stores an indication of the decision and may act upon it in one or more enforcement phases, as specified in configuration policy.

In some implementations, the PnP driver or another component may calculate a hash or other unique descriptor for an enumerated bus device. Such a calculation may occur during or after a first appearance of that enumerated bus device for comparison of its indicative features to the configuration policy. The decision reached during the decision phase may then be associated with the hash or unique descriptor so that upon any subsequent attachments/appearances of the enumerated bus device, previous decision is referred to and the comparison to the configuration policies is not repeated. Thus, use of the hash or unique descriptor and its association with a decision saves the need for subsequent processing which would simply repeat the comparison of indicative features to configuration policy.

The ability to identify unique devices also greatly reduces data transmission and storage costs when sending device information to a cloud service, such as a remote security service. For example, a company may standardize on a certain type of mouse for their employees. Assuming these mice are all the same type and were made on the same assembly line, they will all contain the exact same firmware image. This may mean that their indicative features will be identical. Ideally such a hash or unique descriptor would only be reported once, the first time it is seen on any computer, or once per system, for every system. Bounding these hash or unique descriptors is done by restricting transmission based on the SHA-256 hash of all of the indicative features that are collected (currently device, configuration, interface, endpoint), which are called a descriptor set. The PNP driver retrieves a device's indicative features, hashes them, and transmits them to a remote security service if they have not previously been sent on that system. If the same indicative feature set is seen again on this system (e.g., the device is plugged into a different port, ejected and reinserted, or a second identical device is plugged in), it will not be transmitted to the remote security service. This bounding is persisted across system reboots.

In an enforcement phase, the PnP driver may alter, limit, or otherwise block the functionality of the enumerated bus device. Such altering, limiting, or blocking may occur during installation for the enumerated bus device, before its driver has been located, or after installation, during a device start for the enumerated bus device. In this latter case, the PnP driver attaches to the USB device as a filter in the device stack of the enumerated bus device. The PnP driver may then fail a device start command from a PnP manager, causing the device start to fail and the device stack for the enumerated bus device to be torn down. Other altering, limiting, or blocking techniques include altering installation strings or capability flags for the enumerated bus device; requesting powering off, disabling, or power cycling of the port for the enumerated bus device; returning a failure status for an add device routine; removing an identifier of the enumerated bus device from an enumeration of enumerated bus devices; suspending the enumerated bus device by updating a state machine of a hub device; or taking any further action based on the configurable policies.

In some implementations, the PnP driver may also decide to alter, limit, or otherwise block an enumerated bus device after its installation and start based on analysis of traffic associated with the enumerated bus device. For example, the PnP driver, which may be attached to the device stack of the enumerated bus device, may generate traffic and transmit the traffic to the driver for that enumerated bus device. The PnP driver may then monitor the response, and if the response indicates that the enumerated bus device may be different from what it claims to be, the PnP driver may decide to alter, limit, or otherwise block functionality of the enumerated bus device or to monitor it further.

In various implementations, the PnP driver may inventory the enumerated bus devices connected to the computing device and provide that information to a security agent on the computing device or to a remote security service. Such an inventory may be provided in the form of a PnP device tree, for example. The information gathered while inventorying enumerated bus devices may also be used to create a fingerprint for each enumerated bus device that may be used like a serial number to uniquely identify the enumerated bus device. Such gathered information may also be combined with information maintained by a remote security service to generate the fingerprints.

In further implementations, the PnP driver may create a CDO to enable communication between the PnP driver and a user-mode process or thread. The CDO enables the user-mode process or thread to configure or control the PnP driver. The PnP driver may also remove the CDO when either a count associated with USB devices connected to the computing device reaches zero or when the PnP driver receives a shutdown command from the user-mode process or thread.

Environment

FIG. 1 illustrates an example computing environment including a computing device, enumerated bus devices connected to that computing device, and software components for managing and securing the computing device and enumerated bus devices. As illustrated, a computing device 102 may include an enumerated bus hub 104 (internal to the computing device 102), such as a USB hub, and may be connected to multiple enumerated bus devices such as a mouse 106 and a thumb drive 108. Additionally, the computing device 102 may be connected to a security service cloud 110 and receive security service from the security service cloud 110. The computing device 102, may also include a processor 112 and memory 114, the memory 114 storing an operating system 116, a registry 118, a PnP manager 120, and device stacks 122. The device stacks 122 may each include an enumerated bus driver/physical device object (PDO) 124 and a PnP driver 126 attached as a filter. Such a filter is often referred to as an F-DO. The memory 114 may also store CDOs 128 and a security agent 130. Additionally, the computing device 102 may have other memory devices 132, be connected to other enumerated bus devices 134, be connected to input/output devices 136, and have connections 138 with other computing device(s). Further, the device stacks 122 may include at least device stacks 122 for the hub 104, mouse 106, and thumb drive 108, each device stack 122 including a PDO 124 and a function device object (FDO) 140, as well as a PnP driver 126 attached either as an upper-device filter above the FDO 140 or as a lower-device filter between the PDO 124 and FDO 140.

In various implementations, a computing device 102 may be any sort of computing device equipped with one or more external enumerated bus ports and/or one or more internal ports found on internal hubs. For example, the computing device 102 may be a work station, a personal computer (PC), a laptop computer, a tablet computer, a personal digital assistant (PDA), a cellular phone, a media center, an embedded system, a server or server farm, multiple, distributed server farms, a mainframe, or any other sort of device or devices.

The computing device 102 includes as least one hub 104. The hub 104 may be a root hub, a non-root hub, or a child hub connected to a root hub. Hub 104 may represent multiple connected hubs of the computing device 104. Hub 104 may include one or more external enumerated bus ports for physically connecting to external enumerated bus devices, such as mouse 106, thumb drive 108, or other enumerated bus devices 134. Mouse 106 may be a cordless mouse that wirelessly communicates with a USB dongle that couples with an enumerated bus port of hub 104 or a wired mouse with an enumerated bus connector that couples with an enumerated bus port of hub 104. Thumb drive 108 may be any sort of thumb drive that includes an enumerated bus connector that couples with an enumerated bus port of hub 104. Further, the other enumerated bus devices 134 may be any sort of enumerated bus devices, such as keyboards, microphones, display devices, audio speakers, printers, barcode readers, image scanners, webcams, game controllers, light pens, projectors, digital cameras, etc.

In some implementations, the computing device 102 and security service cloud 110 may be connected by any sort of network or networks, such as wide area networks (WANs), local area networks (LANs), the Internet, or any combination of such networks.

In various implementations, the security service cloud 110 implements a remote security service that interfaces with security agents 130, security agent PnP drivers 126, or both from computing device 102 and other computing devices. The security service cloud 110 may aggregate and analyze information received from the computing device 102 and other computing devices (such as system inventories, enumerated bus device fingerprints, traffic information, user-login identifications, etc.) and may take actions, such as updating configurations of security agents 130, security agent PnP drivers 126, or both, or sending commands to the computing devices to take some action (e.g., alter, limit, or otherwise block functionality of a device or process). The security service cloud 110 may also participate in creating fingerprints for enumerated bus devices, as discussed in greater detail herein.

The security agent 130 may be a kernel-level security agent, which may monitor and record activity on the computing device 102, may analyze the activity, and may generate alerts and events and provide those alerts and events to the security service cloud 110. The security agent 130 may be installed by and configurable by the security service cloud 110, receiving, and applying while live, configurations of the security agent 130 and its component(s), such as security agent PnP driver 126. An example security agent 130 is described in greater detail in U.S. patent application Ser. No. 13/492,672, entitled "Kernel-Level Security Agent" and filed on Jun. 8, 2012, which issued as U.S. Pat. No. 9,043,903 on May 26, 2015.

In various implementations, the security agent PnP driver 126 (also referred to herein as PnP driver 126) may be a component of the security agent 130 loaded based on actions of the security agent 130, operating system 116, and the PnP manager 120. For instance, the security agent 130 may write a registry key associated with a hub device, such as a root hub, to the registry 118, causing the PnP manager 120 to load the PnP driver 126 as an upper-device filter in the device stack 122 of the hub device. Once loaded, the PnP driver 126 may attach to device stacks of other enumerated bus devices of the computing device 102 as a filter, may perform a system inventory on the enumerated bus devices, create fingerprints for the enumerated bus devices, and alter, limit, or otherwise block enumerated bus devices. The PnP driver 126 may also create a CDO 128 to communicate with the security agent 130, enabling the security agent 130 to control and/or configure the PnP driver 126 through the CDO 128. Further, the PnP driver 126 may identify the user logged in at the time that the already-logged-in user plugs in a new enumerated bus device and report the association of the user-login information with the enumerated bus device to the security agent 130 or to a remote security service. The loading, attaching, and other operations of the PnP driver 126 are described herein in greater detail with reference to FIGS. 2-5.

In some implementations, the processor(s) 112 include a central processing unit (CPU), a graphics processing unit (GPU), or both CPU and GPU, or other processing unit or component known in the art.

In various implementations, memory 114 may be system memory and is volatile (such as RANI), non-volatile (such as ROM, flash memory, etc.) or some combination of the two. Computing device 102 also includes additional data storage devices (removable and/or non-removable) such as, for example, magnetic disks, optical disks, or tape. Such additional storage is illustrated in FIG. 1 by other memor(ies) 132. Non-transitory computer-readable media may include volatile and nonvolatile, removable and non-removable tangible, physical media implemented in technology for storage of information, such as computer readable instructions, data structures, program modules, or other data. System memory 114 and other memor(ies) 132 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the computing device 102. Any such non-transitory computer-readable media may be part of the computing device 102.

In further implementations, computing device 102 also has input and device(s) 136, such as a keyboard, a mouse, a touch-sensitive display, a voice input device, a display, speakers, a printer, etc. These devices are well known in the art and need not be discussed at length here. Ones of such input/output devices 136 may be among the enumerated bus devices 104-108 and 134 or may be connected to computing device 102 through different mechanisms (e.g., a video graphics array (VGA) connector).

The computing device 102 also contains communication connections 138 that allow the computing device 102 to communicate with other computing devices, such as device (s) of the security service cloud 110.

In various implementations, the operating system (OS) 116 may be any sort of operating system, such as a Windows® operating system, a UNIX-based operating system, etc. The OS 116 may be any sort of software that supports basic functions of the computing device 102, such as scheduling tasks, executing applications, and controlling peripherals (such as enumerated bus devices).

The registry 118 is a database that stores low-level settings for the OS 116 and for applications of computing device 102 configured to use the registry 118. The registry 118 may also be part of OS 116 or a separate component that interfaces with the OS 116. The kernel of OS 116, device drivers (including enumerated bus device drivers 120), and other services may all use the registry 118. Settings stored in the registry 118 may be stored as values associated with registry keys of the registry 118.

The PnP manager 120 supports plug-and-play functionality for the OS 116, and may be part of OS 116 or a separate, interfacing component. The PnP manager 120 is responsible for PnP device detection and enumeration during a boot phase of the computing device 102 or of attached PnP devices (e.g., enumerated bus devices) and for adding/removing PnP devices while the system is running. PnP devices include enumerated bus devices, such as hub 104, mouse, 106, thumb drive 108, and other enumerated bus devices 134, and PnP manager 120 accordingly manages and interfaces with such devices. Among its functions, the PnP manager 120 may call the DriverEntry and AddDevice routines of any PnP device driver (including enumerated bus device drivers) and may send a start device command (e.g., IRP_MN_START_DEVICE) to PnP devices (including enumerated bus devices). The PnP manager 120 may also build and maintain a PnP device tree of PnP devices on the computing device 102 based on information received from drivers of those PnP devices.

In some implementations, device stacks 122 each correspond to a device node for an enumerated bus device in a PnP device tree. Each device stack 122 includes at least one device object associated with a PnP driver. For example, each device stack 122 includes at least a PDO 124 for the PnP enumerated bus driver of an enumerated bus device. Creation of the PDO 124 may precede creation of the device stack 122 and the device stack 122 may be created with the PDO 124 as the base/lowest-level device object of the device stack 122. The device stack 122 may also include an FDO 140 associated with a function driver for the enumerated bus device, the function driver handling read, write, and device control requests received, for example, from the PnP manager 120 or from a filter driver. Above or below the FDO 140 in the device stack 122, the device stack 122 may include one or more filter device objects associated with filter drivers, such as PnP driver 126. Such filter drivers may be upper-device filters, with their object placed above the FDO 140 in a device stack 140, or lower-device filters, with their object placed between the FDO 140 and PDO 124 in a device stack 122.

In FIG. 1, three device stacks 122 are shown for illustrative purposes. Device stack 122a corresponds to hub 104. Device stack 122b corresponds to mouse 106. Device stack 122c corresponds to thumb drive 108. Device stack 122a includes PDO 124a, FDO 140a, and an object for PnP driver 126a attached as an upper-device filter. Device stack 122b includes PDO 124b, FDO 140b, and an object for PnP driver 126b attached as a lower-device filter. Device stack 122c includes PDO 124c, FDO 140c, and an object for PnP driver 126c attached as a lower-device filter. As discussed further herein, PnP driver 126 attaches as an upper-device filter for hubs and controllers and as a lower-device filter for other enumerated bus devices.

In various implementations, PnP driver 126 may create a CDO 128 to enable communication between the PnP driver 126 and security agent 130. CDO 128 may be any sort of CDO, such as an object representing a software-only virtual device. The CDO 128 may not be part of the device stacks 122 but may be utilized by drivers that are part of the device stacks 122, such as PnP driver 126, for communication with user-mode processes or threads, such as security agent 130.

Operations

FIGS. 2-5 illustrate example processes 200, 300, 400, and 500. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 2:
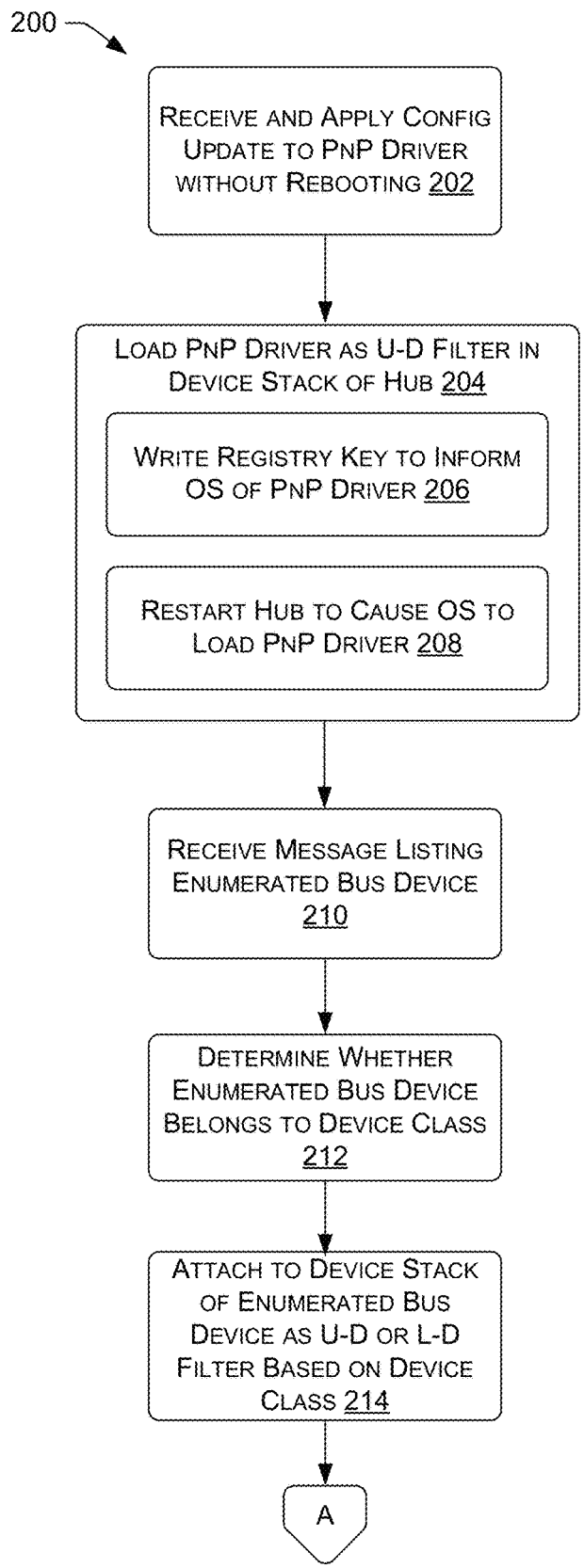
FIG. 2 illustrates an example process for loading a plug-and-play (PnP) driver as an upper-device filter in a device stack of a hub of a computing device and for attaching the PnP driver to device stacks of other enumerated bus devices of the computing device as either an upper-device filter or lower-device filter depending on device classes of those enumerated bus devices.

FIG. 2 illustrates an example process for loading a plug-and-play (PnP) driver as an upper-device filter in a device stack of a root hub or a non-root hub of a computing device and for attaching the PnP driver to device stacks of other enumerated bus devices of the computing device as either an upper-device filter or lower-device filter depending on device classes of those enumerated bus devices. Process 200 illustrates, at 202, the security agent 130 or PnP driver 126 receiving, and applying while live, a configuration update without rebooting. Such an update may affect policies, IoAs, threat responses, etc. If both the security agent 130 and PnP driver 126 are loaded, the configuration update may be provided through CDO 128, as described further herein. While the receiving of the configuration update at 202 is shown as occurring before loading of the PnP driver 126 and attaching of it to device stacks 122, the receiving at 202 may occur at any point during the operations shown at FIGS. 2-5.

At 204, the security agent 130 may cause the computing device 102 to load the PnP driver 126 as an upper-device filter in a device stack 122 of a hub. This may include, at 206, writing a registry key to the registry 118 to indicate to OS 116 that the PnP driver 126 should be loaded as an upper-device filter in the device stack 122 of the hub upon initialization of the hub. The security agent 130 may then restart the hub, at 208, to cause the OS 116 to load the PnP driver 126 (e.g., by calling its AddDevice routine). After its AddDevice routine is called, the PnP driver 126 may inspect the device instance path for to determine if the device is a hub. Based on that inspection, the PnP driver 126 attaches to the device stack 122 of the hub as an upper-device filter.

At 210, the PnP driver 126 then receives a message listing an enumerated bus device that is connected to the computing device 102. For example, when the PnP manager 120 issues a request (e.g., IRP_MN_QUERY_DEVICE_RELATIONS) to the bus driver for it to enumerate the enumerated bus devices attached to it, the PnP driver 126, as an upper-device filter in the device stack 122 of the hub, will see both that request and the response. The PnP driver 126 may also check to ensure that it is attached to the device stack 122 of a hub as the PnP driver 126 may not be configured to evaluate enumerations received from non-hub devices.

At 212, the PnP driver 126 determines whether at least one enumerated bus device mentioned in the received message belongs to a device class. For example, for each enumerated bus device mentioned in an enumeration response from the hub driver, the PnP driver 126 may determine the type of the enumerated bus device. To determine the type of each enumerated bus device, the PnP driver may issue a request for the indicative features for that enumerated bus device (e.g., from the hub driver).

At 214, the PnP driver 126 then attaches as an upper-device filter or a lower-device filter in a device stack 122 associated with each of the enumerated enumerated bus devices. For example, if the indicative features for a given device indicates that it is a hub or controller, the PnP driver 126 waits for its AddDevice routine to be invoked to be added as an upper-device filter for that hub or controller. If the indicative features indicate that the enumerated bus device is a different sort of enumerated bus device, other than a hub or controller, then the PnP driver 126 attaches to the device stack 122 of that enumerated bus device as a lower-device filter.

In some implementations, an enumerated bus device may include multiple device drivers and multiple associated device stacks 122. For such devices, it is possible that the PnP driver 126 may attach as an upper-device filter in one of the device stacks 122 and as a lower-device filter in another of the device stacks 122.

Figure 3:
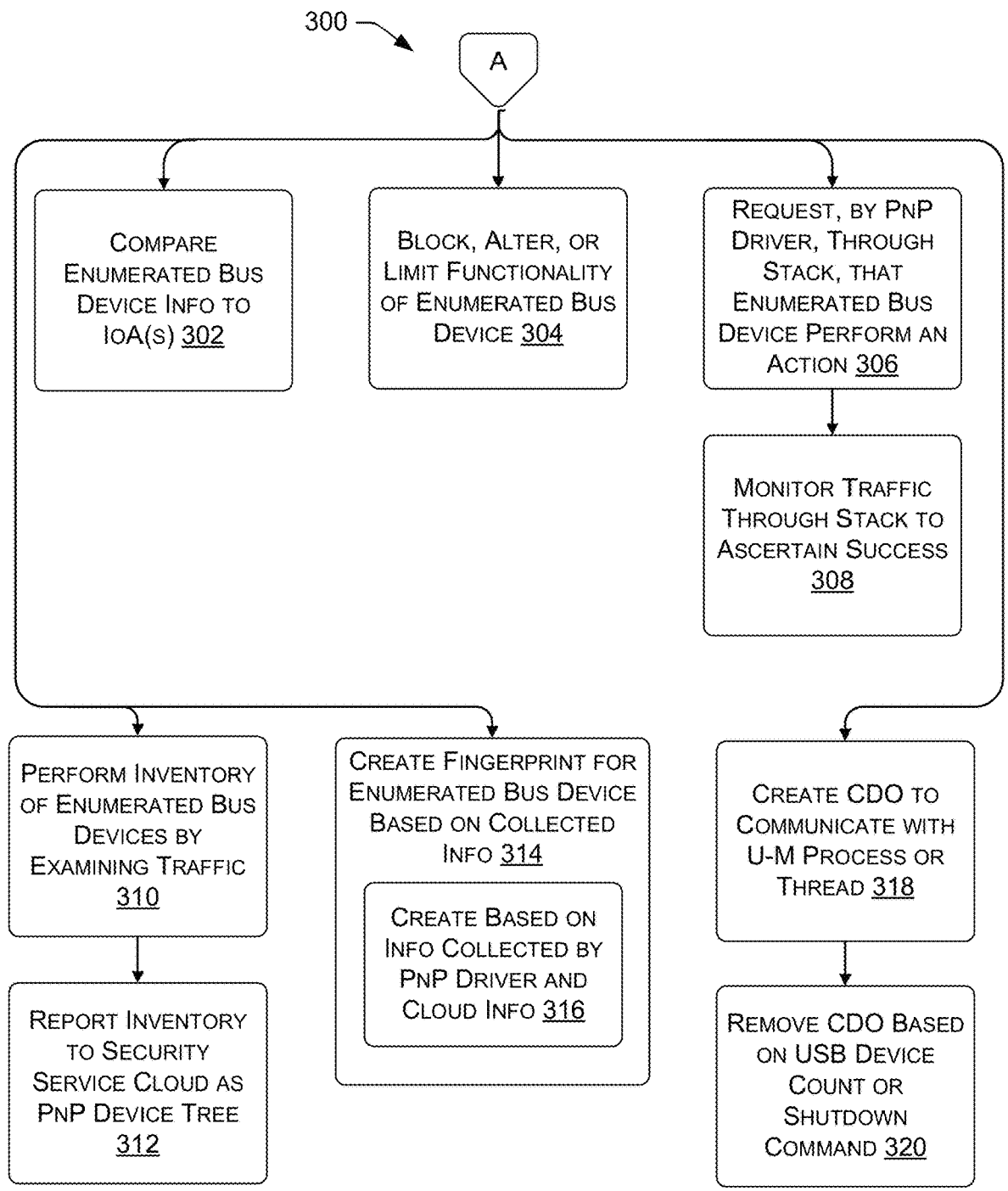
FIG. 3 illustrates an example process for taking actions by a PnP driver attached or attaching to a device stack of an enumerated bus device as a filter, including blocking, inventorying, and fingerprinting, among others.

FIG. 3 illustrates an example process for taking actions by a PnP driver attached or attaching to a device stack of an enumerated bus device as a filter, including altering, limiting, or otherwise blocking, inventorying, and fingerprinting, among others. Process 300 shows, at 302-320, a number of different operations that the PnP driver 126 may perform when attached/loaded to device stack(s) 122.

At 302, the PnP driver 126 may compare indicative features, traffic, fingerprints (described further herein), or other information for an enumerated bus device to IoAs. Such IoAs may be configurable policies that form part of a configuration of the PnP driver 126. During a decision phase for altering, limiting, or otherwise blocking of enumerated bus devices, the PnP driver 126 may utilize the IoAs to determine whether to alter, limit, or otherwise block ones of the enumerated bus devices. For example, the PnP driver 126 may retrieve the indicative features for an enumerated bus device, as mentioned above, and determine that information included in the indicative features matches an IoA. The PnP driver 126 may then store an indicator that the enumerated bus device associated with the indicative features is to be altered, limited, or otherwise blocked in an enforcement phase.

At 304, the PnP driver 126 may take action to alter, limit, or otherwise block functionality of an enumerated bus device. Such action may occur during an enforcement phase and may have been made based on matches with one or more IoAs. Altering, limiting, or otherwise blocking of functionality is discussed in greater detail with reference to FIG. 4.

At 306-308, the PnP driver 126 may take further diagnostic actions that it may then use to provide intelligence to the security agent 130 or security service cloud 110 or to alter, limit, or otherwise block an enumerated bus device. At 306, the PnP driver 126 requests through a device stack 122 that the enumerated bus device associated with that device stack 122 perform an action. For example, the PnP driver 126 may transmit a USB request block (URB) to the driver of the enumerated bus device requesting that it perform an action. At 308, the PnP driver 126 monitors the traffic generated responsive to the request to determine whether the at least one enumerated bus device has performed the requested action. For example, if the enumerated bus device is claiming to be a keyboard, and the response to the request either shows the device performing an action that a keyboard cannot perform or failing to perform a task that a keyboard can perform, the PnP driver 126 may conclude that the enumerated bus device is not in fact a keyboard.

At 310, the PnP driver 126 may perform an inventory of enumerated bus devices connected to the computing device 102 by examining messages passed through device stacks 122 of the enumerated bus devices. Such messages may include enumerations of child devices, indicative features, configuration descriptors, interface descriptors, interface association descriptors (IADs), human interface device (HID) classes, OS descriptors (e.g., Microsoft® OS descriptors (MODs)), device serial numbers, other device identifiers provided by the OS 116 or by vendors of the enumerated bus devices (e.g., through firmware or hardware), device location information, and/or other traffic. For example, the inventory may include an enumeration of enumerated bus ports available on the computing device 102, types of enumerated bus technology used on the computing device 102, internal or external hubs of the computing device 102, numbers of ports associated with each hub of the computing device 102, speeds of ports of the computing device 102, power draws of ports of the computing device 102, type(s) of controller(s) on the computing device 102, identifications of any port that a keyboard is plugged in to, or identifications of any port that a mass storage device or a hacking device is plugged in to. At 312, the PnP driver 126 may then report the inventory to the security agent 130 or security service cloud 110. The inventory may be organized as a PnP device tree. The PnP driver 126 may construct the tree by retrieving the tree maintained by the OS 116 and by updating that tree.

At 314, the PnP driver 126 may create a fingerprint for an enumerated bus device based on information collected by the PnP driver 126, such as the information collected for the system inventory and/or other information captured from enumerations, indicative features, configuration descriptors, interface descriptors, IADs, HID classes, OS descriptors (e.g., MODs), device serial numbers, other device identifiers provided by the OS 116 or by vendors of the enumerated bus devices (e.g., through firmware or hardware), device location information, and/or device stack traffic. At 316, creating the fingerprint may be based on both the information collected by the PnP driver 126 and on information gathered by a cloud service, such as security service cloud 110. In such implementations, the security service cloud 110 may provide information to the computing device 102 to enable fingerprint creation by the PnP driver 126 or security agent 130, or the PnP driver 126 may provide information to the security service cloud 110 to enable fingerprint creation by the security service cloud 110. The fingerprint may then be included in subsequent deployments of configurations for the security agent 130 and/or the PnP driver 126 to be used to trigger altering, limiting, or otherwise blocking or monitoring.

At 318, the PnP driver 126 may create a CDO 128 to communicate with a user-mode process or thread, such as security agent 130. At 320, the PnP driver 126 may then subsequently remove the CDO 128 when either a count associated with enumerated bus devices connected to the computing device 102 reaches zero or when the PnP driver 126 receives a shutdown command from the user-mode process or thread. The actions shown at 318-320 are described below in further detail with respect to FIG. 5.

Figure 4:
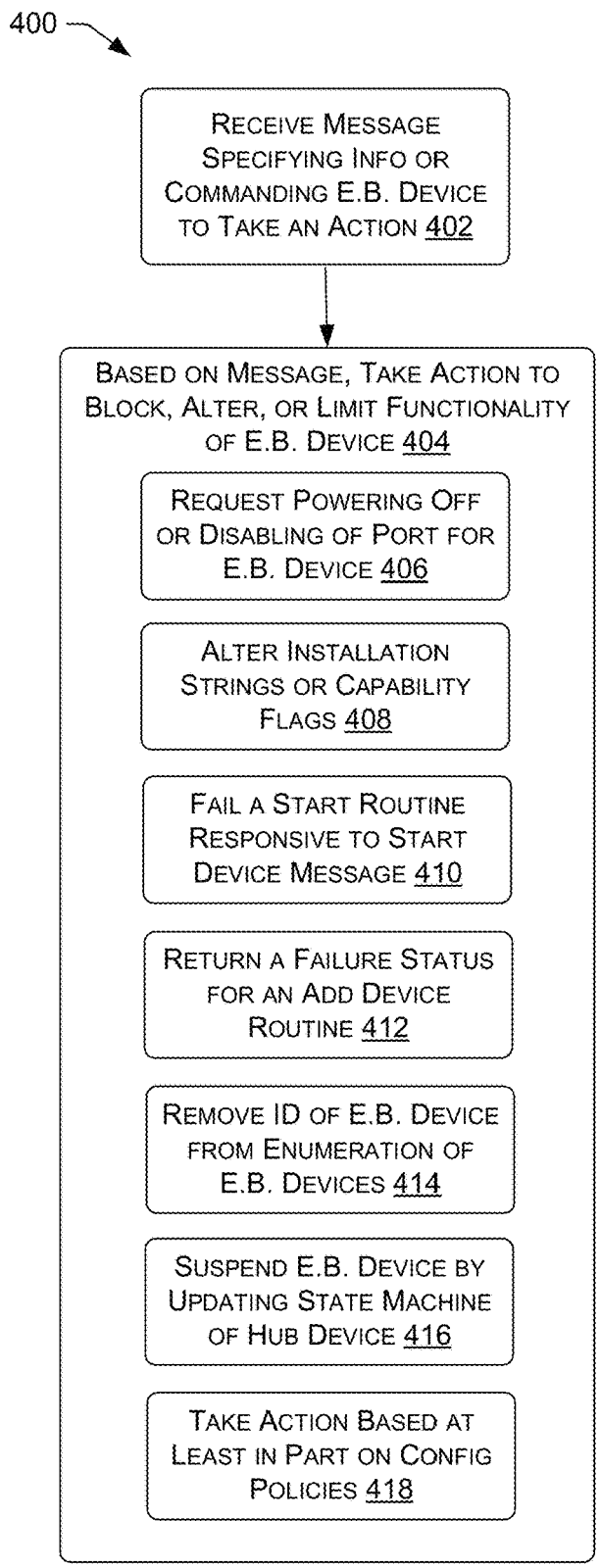
FIG. 4 illustrates an example process for taking action by a PnP driver to alter, limit, or otherwise block functionality of an enumerated bus device.

FIG. 4 illustrates an example process for taking action by a PnP driver to alter, limit, or otherwise block functionality of an enumerated bus device. Process 400 shows, at 402, the PnP driver 126 receives a message directed through the device stack 122 of an enumerated bus device that the PnP driver 126 is attached to. The message may specify indicative features of at least one of the enumerated bus devices connected to the computing device 102 or command the at least one of the enumerated bus devices to take an action. For example, the message may be a response to an enumeration request received at a device stack 122 of a hub device. The message may list enumerated bus devices connected to the hub device. The PnP driver 126 may then query for information associated with those listed enumerated bus devices and make an altering, limiting, or otherwise blocking decision for each such enumerated bus device. For example, as discussed further herein, the PnP driver 126 may compare the information received in the message to one or more fingerprints or configurable policies to determine whether to alter, limit, or otherwise block an enumerated bus device. If the PnP driver 126 decides to alter, limit, or otherwise block functionality of the enumerated bus device, the PnP driver 126 may store an indication of the decision for use in a subsequent enforcement phase. In one implementation, the PnP driver 126 may also store an indication of a method to be used in altering, limiting, or otherwise blocking functionality of the enumerated bus device.

At 404, the PnP driver 126 takes action to alter, limit, or otherwise block functionality of an enumerated bus device. Such action may occur in an enforcement phase (e.g., during installation or starting of the enumerated bus device).

At 406, the action taken may be sending a request to a hub device requesting that an individual port of the hub associated with the enumerated bus device be powered off, disabled, or power cycled.

Alternatively, at 408, the action may be altering installation strings or capability flags for the enumerated bus device. The PnP driver 126 may filter the PnP manager 120's IRP_MN_QUERY_ID message and alter the returned strings (e.g., hardware ID strings and/or compatibility ID strings) to a string that does not map to any driver INF file on the computing device 102, or which alters the strings to map to a different INF file. The technique may then further include the PnP driver 126 filtering and altering flags in IRP_MN_QUERY_CAPABILTIES, for purposes such as stealth blocking, so as not to alert the user in device manager, toasts, popups, or other user indications.

In another implementation, a set of files associated with the PnP driver or security service are pre-installed into the system that register the PnP driver or security service as a new "device class". At that point, the installation string is modified to pretend that the device is part of the new device class, and various other descriptive strings are set to those of the blocked device. This may cause the operating system to look for a descriptor for this device class, and it finds the new device class, which says "Blocked Device". Because such files are pre-installed, the PnP driver or security service is effectively added to the operating system Device Manager and a user can see the device, as well as any descriptive strings encoded from the original device. Furthermore, a "property sheet library" is also installed, which displays a custom interface to the user when they double click on such a device (e.g., from within the Microsoft Device Manager UI), including with a password-protected unblock command and other capabilities, such as to inspect device property details and to determine why the device was blocked.

Alternatively, at 410, the action may be failing, by the PnP driver, a start routine initiated by a start device message received from a PnP manager 120. The PnP manager 120 may send an IRP_MN_START_DEVICE message which may be received by the FDO 140 of the enumerated bus device. The functional driver of the enumerated bus device is then loaded and the message passed to the PnP driver 126. The PnP driver 126 then returns a failure status code to PnP manager 120, causing the function driver to be unloaded and the device stack 122 to be torn down.

Alternatively, at 412, the action may be returning a failure status for an AddDevice routine to a PnP manager 120 to cause a device stack for the enumerated bus device to be torn down. Such a technique may be used, for example, for hub or controller devices for which the PnP driver 126's AddDevice routine is called.

Alternatively, at 414, the action may be removing an identification of the enumerated bus device from an enumeration of the one or more enumerated bus devices. Such a removal may be made by the PnP driver 126 to the enumeration response from a hub driver. When the PnP manager 120 receives the altered response, it will not see an identification of the enumerated bus device and thus will not allocate PnP resources to it and the device will not function at all on the system Alternatively, at 416, the action may be suspending the enumerated bus device by updating a state machine of a hub device. This suspension—referred to as selective suspend—may be achieved via PnP messages to the PnP manager 120 rather than through direct communication with the hub device.

Alternatively, at 418, the action may be any other sort of altering, limiting or blocking action taken based at least on part on configurable policies of the PnP driver 126.

Figure 5:
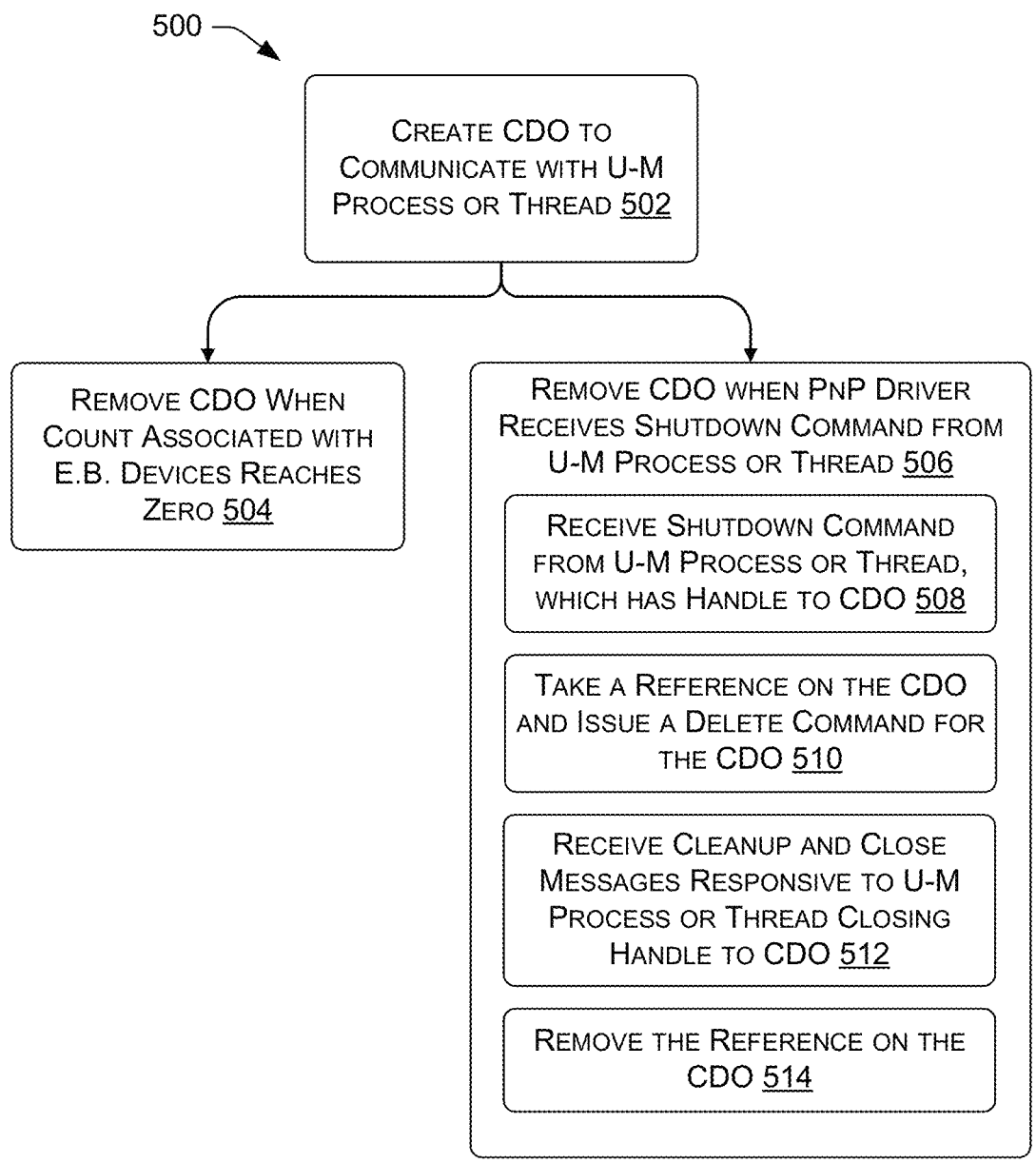
FIG. 5 illustrates an example process for creating, by a PnP driver, a control device object (CDO) to enable communication with a user-mode process or thread and for removing the CDO.

FIG. 5 illustrates an example process for creating, by a PnP driver, a control device object (CDO) to enable communication with a user-mode process or thread and for removing the CDO. Process 500 illustrates, at 502, the PnP driver 126 creating a CDO 128 to communicate with a user-mode process or thread, such as security agent 130. The PnP driver 126 may create the CDO 128 during a first device start command for a first enumerated bus device (e.g., IRP_MN_START_DEVICE). Alternatively, the PnP driver 126 may create the CDO 128 in its DriveEntry, which is called when the PnP driver 126 is first loaded. Once created, the PnP driver 126 can receive and respond to commands from a user-mode process or thread, such as security agent 130, through the CDO 128 and/or receive configuration/policy updates from a user-mode process or thread, such as security agent 130, through the CDO 128.

At 504, the PnP driver 126 removes the CDO 128 when a count associated with enumerated bus devices connected to the computing device reaches zero. The PnP driver 126 may keep a count of enumerated bus devices by incrementing a counter for each start device message (e.g., IRP_MN_START_DEVICE) sent and decrementing the counter for each remove device message (e.g., IRP_MN_REMOVE_DEVICE) sent. When the counter reaches zero, the PnP driver 126 may then remove the CDO 128.

Alternatively to 504, at 506, the PnP driver 126 removes the CDO 128 when the PnP driver 126 receives a shutdown command from the user-mode process or thread. At 508, the user-mode process or thread opens a handle to the CDO 128 and issues a shutdown command to the PnP driver 126, e.g., as an IOCTL. At 510, in response to the shutdown command, the PnP driver 126 takes a reference on the CDO 128 and deletes the CDO 128. However, the CDO 128 remains because of the reference taken to it. At 512, the user-mode process or thread closes the handle to the CDO 128, which causes cleanup and close messages (e.g., IRP_MJ_CLEANUP and IRP_MJ_CLOSE) to be emitted, in that order, to the PnP driver 126. At 514, upon receiving the close message, and remembering that the user-mode process or thread previously sent the shutdown command, the PnP driver 126 removes the last reference on the CDO 128, which results in the removal of the CDO 128. Because the CDO 128 has been removed, the PnP driver 126 may be subsequently unloaded (e.g., upon restart of all enumerated bus devices).

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
    receiving, by a plug-and-play (PnP) driver implemented on a computing device, a message listing at least one enumerated bus device that is connected to the computing device;
    determining, by the PnP driver, whether the at least one enumerated bus device belongs to a device class; and
    based at least in part on the determining, attaching the PnP driver as an upper-device filter or a lower-device filter in a device stack associated with the at least one enumerated bus device, wherein the device class includes at least one of hubs or controllers, and the attaching comprises attaching as an upper-device filter if the at least one enumerated bus device is a hub or a controller and attaching as a lower-device filter if it is not.

2. The method of claim 1, wherein an upper-device filter is attached above a function device object of the device stack and a lower-device filter is attached between a function device object of the device stack and a physical device object of the device stack.

3. The method of claim 1, further comprising loading the PnP driver as an upper-device filter in a device stack of a hub, including writing a registry key indicating to operating system of the computing device that the PnP driver should be loaded as an upper-device filter in the device stack of the hub upon initialization of the hub and restarting the hub to cause the operating system to load the PnP driver.

4. The method of claim 1, wherein the PnP driver is able to receive a configuration update from a security client implemented on the computing device or from a remote security service and apply the configuration update without rebooting the computing device.

5. The method of claim 4, wherein the configuration update includes an indicator of attack usable by the PnP driver to alter, limit, or otherwise block an enumerated bus device that is connected to the computing device.

6. The method of claim 1, further comprising performing, by the PnP driver, an inventory of enumerated bus device(s) connected to the computing device by examining messages passed through device stacks of the enumerated bus device(s).

7. The method of claim 6, wherein the inventory includes an enumeration of enumerated bus ports available on the computing device, types of enumerated bus technology used on the computing device, internal or external hubs of the computing device, numbers of ports associated with each hub of the computing device, speeds of ports of the computing device, power draws of ports of the computing device, type(s) of controller(s) on the computing device, identifications of any port that a keyboard is plugged in to, or identifications of any port that a mass storage device or a hack device is plugged in to.

8. The method of claim 6, further comprising reporting the inventory to a security service cloud, the inventory, organized as a PnP device tree.

9. The method of claim 1, further comprising creating a fingerprint for an enumerated bus device based on information collected by the PnP driver.

10. The method of claim 1, further comprising utilizing a hash technique to create a hash or unique descriptor for an enumerated bus device.

11. The method of claim 1, further comprising:
    requesting, by the PnP driver and through the device stack, that the at least one enumerated bus device perform an action; and
    monitoring, by the PnP driver, traffic transmitted through the device stack to determine whether the at least one enumerated bus device has performed the requested action.

12. The method of claim 1, wherein the at least one device is associated with multiple device stacks, and the PnP driver attaches as an upper-device filter in at least one device stack of the multiple device stacks and as a lower-device filter in at least another device stack of the multiple device stacks.

13. The method of claim 1, wherein the message is a response to an enumeration request from a PnP manager requesting to a receiving bus driver a list of all enumerated bus devices attached to the enumerated bus device represented by the receiving bus driver.

14. The method of claim 1, further comprising taking an action to alter, limit, or otherwise block functionality of the at least one enumerated bus device.

15. The method of claim 1, further comprising:
    creating a control device object (CDO) to communicate with a user-mode process or thread; and
    removing the CDO when either a count associated with enumerated bus devices connected to the computing device reaches zero or when the PnP driver receives a shutdown command from the user-mode process or thread.

16. A system comprising:
    a processor; and
    a plug-and-play (PnP) driver implemented on a computing device, the PnP driver being operated by a processor of the computing device to:
        receive a message listing at least one enumerated bus device that is connected to the computing device;
        determine, by the PnP driver, whether the at least one enumerated bus device belongs to a device class; and
        based at least in part on the determining, attaching the PnP driver as an upper-device filter or a lower-device filter in a device stack associated with the at least one enumerated bus device, wherein the at least one enumerated bus device is associated with multiple device stacks, and the PnP driver attaches as an upper-device filter in at least one device stack of the multiple device stacks and as a lower-device filter in at least another device stack of the multiple device stacks.

17. The system of claim 16, wherein the device class includes at least one of hubs or controllers, and the attaching comprises attaching as an upper-device filter if the at least one enumerated bus device is a hub or a controller and attaching as a lower-device filter if it is not.

18. The system of claim 16, wherein an upper-device filter is attached above a function device object of the device stack and a lower-device filter is attached between a function device object of the device stack and a physical device object of the device stack.

19. The system of claim 16, further comprising loading the PnP driver as an upper-device filter in a device stack of a hub, including writing a registry key indicating to operating system of the computing device that the PnP driver should be loaded as an upper-device filter in the device stack of the hub upon initialization of the hub and restarting the hub to cause the operating system to load the PnP driver.

20. The system of claim 16, wherein the PnP driver is able to receive a configuration update from a security client implemented on the computing device or from a remote security service and apply the configuration update without rebooting the computing device.

21. The system of claim 20, wherein the configuration update includes an indicator of attack usable by the PnP driver to alter, limit, or otherwise block an enumerated bus device that is connected to the computing device.

22. The system of claim 16, further comprising performing, by the PnP driver, an inventory of enumerated bus device(s) connected to the computing device by examining messages passed through device stacks of the enumerated bus device(s).

23. The system of claim 22, wherein the inventory includes an enumeration of enumerated bus ports available on the computing device, types of enumerated bus technology used on the computing device, internal or external hubs of the computing device, numbers of ports associated with each hub of the computing device, speeds of ports of the computing device, power draws of ports of the computing device, type(s) of controller(s) on the computing device, identifications of any port that a keyboard is plugged in to, or identifications of any port that a mass storage device or a hack device is plugged in to.

* * * * *